US008739093B1

(12) United States Patent  
Ye (10) Patent No.: US 8,739,093 B1
(45) Date of Patent: May 27, 2014

(54) TIMING CHARACTERISTIC GENERATION AND ANALYSIS IN INTEGRATED CIRCUIT DESIGN

(71) Applicant: LSI Corporation, San Jose, CA (US)

(72) Inventor: Lun Ye, Allentown, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/736,576

(22) Filed: Jan. 8, 2013

(51) Int. Cl.
*G06F 17/50* (2006.01)

(52) U.S. Cl.
USPC .......................................... 716/108

(58) Field of Classification Search
USPC ................................. 716/100, 108
See application file for complete search history.

(56) References Cited

U.S. PATENT DOCUMENTS

| 7,155,691 B2 | 12/2006 | Ratzlaff |
| 7,222,311 B2 | 5/2007 | Kaufman et al. |
| 7,359,843 B1 * | 4/2008 | Keller et al. ................. 703/2 |

OTHER PUBLICATIONS

A.J. Data et al., "Automated Timing Model Generation," ACM 39th Design Automation Conference (DAC), Jun. 2002, pp. 146-151.
Tobias Thiel, "Have I Really Met Timing—Validating PrimeTime Timing Reports with Spice," IEEE Design, Automation and Test in Europe Conference and Exposition (DATE), Feb. 2004, 11 pages, vol. 3, Paris, France.

\* cited by examiner

*Primary Examiner* — Suchin Parihar
(74) *Attorney, Agent, or Firm* — Ryan, Mason & Lewis, LLP (57) ABSTRACT

Techniques for use in integrated circuit design systems for generation and analysis of timing characteristics associated with an integrated circuit design. In one example, a method comprises the following steps. Cells with at least one timing arc are identified from a set of cells, wherein the set of cells are useable in an integrated circuit design. A test circuit is generated comprising an input stage sub-circuit for each terminal serving as an input for each of the identified cells, and an output stage sub-circuit for each terminal serving as an output for each of the identified cells, wherein each input stage sub-circuit is independent of each other input stage sub-circuit, and each output stage sub-circuit is independent of each other output stage sub-circuit. The test circuit is stored for use in a timing delay correlation operation between a first timing analysis process and a second timing analysis process. By way of example only, the first timing analysis process comprises a static timing analysis process and the second timing analysis process comprises a circuit level analysis process.

20 Claims, 6 Drawing Sheets

```
module x_tsmc_cln28hp_scsi35d_fast_125c_0p935v (
    n1_ADDFX0P5MV0SI35D_A ,
    n1_ADDFX0P5MV0SI35D_B ,
... ...
    n7_XOR4X4MV0SI35D_Z
);

input  n1_ADDFX0P5MV0SI35D_A ;
... ...
output n7_XOR4X4MV0SI35D_Z ;

wire   n2_ADDFX0P5MV0SI35D_A ;
... ...
// library cell: tsmc_cln28hp_scsi35d_fast_125c_0p935v/INVX2FV0SI35D
BUFX1BV0SI35D   x_1_INVX2FV0SI35D  ( .A(n1_INVX2FV0SI35D_A),  .Z(n2_INVX2FV0SI35D_A) );
BUFX1BV0SI35D   x_2_INVX2FV0SI35D  ( .A(n2_INVX2FV0SI35D_A),  .Z(n3_INVX2FV0SI35D_A) );
BUFX1BV0SI35D   x_3_INVX2FV0SI35D  ( .A(n3_INVX2FV0SI35D_A),  .Z(n4_INVX2FV0SI35D_A) );
BUFX3BV0SI35D   x_5_INVX2FV0SI35D  ( .A(n5_INVX2FV0SI35D_Z),  .Z(n6_INVX2FV0SI35D_Z) );
BUFX3BV0SI35D   x_6_INVX2FV0SI35D  ( .A(n6_INVX2FV0SI35D_Z),  .Z(n7_INVX2FV0SI35D_Z) );
INVX2FV0SI35D   x_4_INVX2FV0SI35D  ( .A(n4_INVX2FV0SI35D_A),  .Z(n5_INVX2FV0SI35D_Z) );
... ...
endmodule
```

```
tsmc_cln28hp  scui35p  gbawp  max  fast_125c_0p935v  1.9%
tsmc_cln28hp  scui35p  gbawp  max  fast_m40c_0p935v  1.1%
tsmc_cln28hp  scui35p  gbawp  max  slow_125c_0p765v  1.5%
tsmc_cln28hp  scui35p  gbawp  max  slow_m40c_0p765v  3.2%
tsmc_cln28hp  scui35p  gbawp  min  fast_125c_0p935v  1.3%
tsmc_cln28hp  scui35p  gbawp  min  fast_m40c_0p935v  0.5%
tsmc_cln28hp  scui35p  gbawp  min  slow_125c_0p765v  0.7%
tsmc_cln28hp  scui3Sp  gbawp  min  slow_m40c_0p765v  2.2%
```

TIMING CHARACTERISTIC GENERATION AND ANALYSIS IN INTEGRATED CIRCUIT DESIGN

FIELD

The present application relates to integrated circuit design.

BACKGROUND

In the design of integrated circuits, it is known that designers typically utilize one or more libraries of functional circuit elements, commonly known as "cells," to design circuits as part of one or more such integrated circuits. These cells are typically standardized in that they have known electrical characteristics such as, for example, propagation delay, capacitance and inductance. Nonetheless, designers implement some form of timing analysis to attempt to ensure that timing constraints are met as one of the requirements before the integrated circuit is submitted for tape out in the manufacturing process. Two such well-known timing analyses are Static Timing Analysis (STA) and Circuit Level Analysis (CLA). The two approaches are typically both performed and then an attempt is made to correlate the results. However, when performing STA, there are multiple sources of error when correlated to CLA timing results that are frequently encountered. A first source of error is due to the mismatch of the technology-dependent characterization parameters used and the electrical parameters encountered in the actual circuit when STA is performed. A second source of error is due to the STA tool itself not being able to achieve accurate delay calculation results even when the characterization parameters used during the timing model characterization process are appropriate.

SUMMARY

Embodiments of the invention provide techniques for use in integrated circuit design systems for generation and analysis of timing characteristics associated with an integrated circuit design.

In one embodiment of the invention, a method comprises the following steps. Cells with at least one timing arc are identified from a set of cells, wherein the set of cells are useable in an integrated circuit design. A test circuit is generated comprising an input stage sub-circuit for each terminal serving as an input for each of the identified cells, and an output stage sub-circuit for each terminal serving as an output for each of the identified cells, wherein each input stage sub-circuit is independent of each other input stage sub-circuit, and each output stage sub-circuit is independent of each other output stage sub-circuit. The test circuit is stored for use in a timing delay correlation operation between a first timing analysis process and a second timing analysis process. In one example, the first timing analysis process comprises an STA process and the second timing analysis process comprises a CLA process.

Alternative embodiments of the invention including, but not limited to, apparatus, integrated circuits and computer-readable storage media, provide other implementations of the timing characteristic generation and analysis described herein in order to improve the integrated circuit design process.

DETAILED DESCRIPTION

Embodiments of the invention will be illustrated herein in conjunction with exemplary integrated circuit design systems. It should be understood, however, that embodiments are more generally applicable to any integrated circuit design systems in which it would be desirable to generate and analyze timing characteristics associated with an integrated circuit design.

In the detailed description to follow, certain acronyms will be used. For convenience, below is a reference list of frequently used acronyms:

STA—Static Timing Analysis
CLA—Circuit Level Analysis
SCDCS—STA-CLA Delay Correlation Study
SCCSTC—STA-CLA Correlation Study Test Circuit
LC—Library Cell
RC—Resistor-capacitor
SC—Sub-circuit Before describing illustrative embodiments of the invention, some further description of the integrated circuit design process and drawbacks associated with existing circuit timing analysis approaches will now be described.

As mentioned above, in the design of integrated circuits, designers typically utilize one or more libraries of cells to design circuits as part of one or more such integrated circuits. These libraries of cells are available to the designer via a computer system, commonly known as a "computer aided design" (CAD) system, and allow the designer to design circuits on a computer display screen simply by selecting particular library cells and placing them in a visual schematic representation of the proposed circuit on the display screen. The cells are a pre-characterized collection of logic gates such as, e.g., AND, OR, NAND, NOR, adders, inverters, etc. This allows the designer to design, with a reasonable degree of confidence, an integrated circuit that performs certain desired functions within specific operational constraints. Such standard cell design is thus able to achieve very high gate density while also achieving desired electrical performance.

As further mentioned above, designers typically implement STA and CLA processes in an attempt to ensure that timing constraints are met in the integrated circuit design. For example, STA is described in J. Bhasker et al., "Static Timing Analysis for Nanometer Designs: A Practical Approach," Springer 2009, and examples of tools that perform STA are Synopsis PrimeTime® (Synopsis Inc. of Mountain View, Calif.) and Cadence ETS® (Cadence Design Systems Inc. of San Jose, Calif.). CLA is described, for example, in K. Kundert, "The Designer's Guide to SPICE and Spectre," Kluwer 1995, and examples of tools that perform CLA are Synopsis HSPICE® (Synopsis Inc. of Mountain View, Calif.) and Cadence Spectre® (Cadence Design Systems Inc. of San Jose, Calif.).

One reason why both STA and CLA processes are used is because it is highly impractical, if not nearly impossible, to verify timing of a non-trivial integrated circuit design using the CLA method alone, due to the prohibitive amount of computing resources and computing time required. As a result, the STA method has been used for sign-off timing analysis, employing pre-characterized timing data stored in a Timing Library File (TLF). This approach is a compromise that potentially sacrifices small and tolerable amounts of error for vastly improved timing sign-off efficiency. The content of a TLF is organized by each library cell and by each timing arc from the input pins to the output pins of the library cell. A timing arc refers to timing information associated with a cell. Every cell may have multiple timing arcs. For example, a combinatorial logic cell (e.g., AND, OR, NAND, NOR, adder, inverter cell) has timing arcs for each input to each output. A sequential cell (e.g., flip-flop) has timing arcs from the clock to outputs and timing constraints for the various data pins with respect to the clock. Each timing arc has a so-called timing sense, i.e., how the output transitions (rise or fall) for different types of transitions (rise or fall) on the input. A timing path is a path through the cell (or through multiple cells) that results in a certain propagation delay, e.g., a maximum propagation delay (max path) or minimum propagation delay (min path).

However, there are errors typically encountered when attempting to correlate STA timing results and CLA timing results using existing approaches. At least two are mentioned above (e.g., parameter mismatch and inaccurate delay characterization results). To minimize STA and CLA timing correlation errors, designers commonly run an STA-CLA Delay Correlation Study (SCDCS) using some test circuits. The existing approach generally performs the following steps. One of more STA-CLA Correlation Study Test Circuits (SCCSTCs) are identified from some existing repository of test blocks that are used for early technology prove-in. These blocks are generally some circuit created for integrated circuit layout tool testing, but used for STA-CLA correlation as well. Usually, only a very small percentage of library cells from a library are used in any such circuits. Some subset of paths is selected from a given SCCSTC as candidates for the SCDCS. Again, only a very small percentage of timing paths (timing arcs) of the SCCSTC are selected for the SCDCS, resulting in low SCDCS coverage. Timing data is obtained by running STA and CLA for the paths obtained in the above step. The data obtained in the above step is obtained and data analysis is performed for an SCCDS improvement strategy.

Thus, there are several drawbacks associated with this existing approach. By way of example only, some of these drawbacks are described below. With this existing approach, the SCDCS coverage is always very low due to some limitations including the following: only a very small number of cells out of a library of several hundred to a couple of thousand cells are used in the SCCSTC construction; and only a small percentage of timing arcs/paths can be used for SCDCS due to the restriction imposed by the interdependence of the selected timing paths. Further, the existing SCCSTC creation method cannot meet the high degree of connectivity and circuit parameter flexibility required for a high quality SCDCS study, i.e.: the input and the output connectivity for any timing arc in the selected timing paths are restricted to the actual implementation of the SCCSTC; and there is no easy way to parameterize any of the SCCSTC circuit parameters for the limited set of timing paths selected. Still further, the existing approach does not guarantee that the timing paths contained in the test circuit are independent. As a result, only a small number of timing paths going through input pins can be used in the SCDCS tasks. This is due to the fact that often times it is impossible to perform CLA executions for the circuit resulting from these interdependent timing paths for the SCDCS. This condition results in low coverage of the STA-CLA studies, since the needed CLA stimulus cannot always be created, hence valid CLA results cannot be obtained when the correct CLA stimulus does not exist. Also, with the existing approach, the SCDCS data generation time and memory requirement is excessively large. This condition is due to the way the SCCSTC is constructed, since the constructed SCCSTC does not have the SCDCS requirement in mind, hence resulting in much more complex circuits that have to be run through the STA and the CLA processes.

Embodiments of the invention overcome the above and other drawbacks. For example, embodiments of the invention provide methods and apparatus for the generation and analysis of electronic circuit pin-to-pin timing arc delay characteristic data. More particularly, a systematic approach is used in creating electronic circuits for study with an independent timing path for each timing arc of a library cell. An independent circuit is created for each of the timing paths with parameterized connectivity and circuit element values. An exhaustive searching method is used in identifying all timing arcs of the electronic circuit to ensure full (e.g., 100 percent) coverage in the study of such electronic circuit timing arc delay characteristics. STA and CLA are performed for each such circuit, probing for delay calculation quantities at the matching arrival points in STA and in CLA results. Data is collected for each timing path of each timing arc of the electronic circuit, across the targeting combinations of process corners, power supply ranges and temperature specifications of interest and the collected data is presented in various graphical and tabular formats.

The electronic circuit timing arc delay characteristic data obtained from an SCDCS is then collected and analyzed in selecting library cell timing model characterization methods and parameters for improved timing analysis (hence reducing integrated circuit design pessimism and failure risk). The electronic circuit timing arc delay characteristic data is also used to identify sources of STA delay calculation errors to improve STA tool accuracy for enhanced quality in integrated circuit timing sign-off results.

The SCDCS approach according to embodiments of the invention improves on the existing approaches, inter alia, by employing timing characteristic generation and analysis techniques such that SCCSTC timing path independence, connectivity flexibility, and element parameterization are achieved. The techniques of the embodiments to be described herein also ensure full (e.g., 100 percent) library cell timing arc coverage in a time efficient manner. In accordance with an illustrative embodiment, the techniques can be generally described in the following steps.

The collection of Library Cells (LC) for the SCDCS task is identified, including all the library cells with at least one timing arc. This step is different from the existing approach in that the existing approach does not identify each library cells explicitly as a candidate for the SCDCS task. Instead, in the existing approach, only a small percentage of library cells in the libraries referenced are used to create a test circuit that satisfies some timing and logic constraints. That is, embodiments of the invention are SCDCS-oriented, selecting all library cells with at least one timing arc, as opposed to only considering some pre-existing timing and/or logic constraints that are not relevant to the SCDCS tasks.

Then, for each input and each bi-directional pin, Pin, of each of the library cells LC1, ..., LCi in the LC collection identified in step (1), the method creates a sub-circuit (SC) such that the output port of this sub-circuit connects to Pin, and the input port of the SC is identified as a primary port of the SCCSTC. As a result, all the SCs for all the Pin pins of the LC are independent of each other. Since the SCs for different timing paths are independent from each other, the necessary CLA stimulus can always be created such that valid CLA results can be obtained.

The above step is repeated for all the output pins, Pout, of each LC. Here, the port connection for the SC is configured such that the input port of the SC is connected to Pout, and the output port of the SC is identified as a primary port of the SCCSTC. As a result, all the SCs for all the Pout pins of the LC are independent of each other. Again, since the SCs for different timing paths are independent from each other, the necessary CLA stimulus can always be created such that valid CLA results can be obtained.

The generated SCs are then parameterized based on technology node and library cell timing characterization methodologies. It is not necessary that each SC be identical. The existing approach does not provide the flexibility needed for the SCDCS, since the entire circuit is created based on some timing and logic constraints that are not suitable for the SCDCS tasks.

The SCCSTC created in the steps above can be saved in a Verilog format, a Very High Speed Integrated Circuit (VHSIC) Hardware Description Language (VHDL) format, or some other HDL format, resulting in a specific SCCSTC with independent timing paths for all pins of all cells in the library with timing arcs. Due to the way the existing approach creates the test circuit, a Verilog, VHDL or some other HDL netlist is needed as input for the test circuit creation, not just an output of the test circuit creation. As a result, flexibility in the SCCSTC connectivity and circuit parameterization is not available with the existing approach.

The parasitic resistor-capacitor (RC) parameters associated with the connections in the SCCSTC can then be synthesized to satisfy library cell driving pin requirements, with precise control of the parameters. This parameterization/synthesis process will be further described below.

Alternatively, the SCCSTC can be fed into an integrated circuit layout tool, such as IC Compiler® (Synopsis Inc. of Mountain View, Calif.), with SCDCS-oriented cell instance placement and interconnect creation, hence enabling fine control of the parasitic RC values for the SCDCS. In contrast, due to the manner in which the existing approach creates the test circuit, the parasitic RC parameters associated with the circuit connections in the SCCSTC are not parameterized based on SCDCS requirements. Instead, these parasitic RC values are obtained from running a parasitic extraction tool such as Synopsis StarRCXT® (Synopsis Inc. of Mountain View, Calif.).

The SCCSTC creation techniques for the SCDCS according to embodiments of the invention thus take into account SCDCS requirements at each step of the SCCSTC creation process, resulting in the rapid creation of the SCCSTC structure with full library cell timing arc SCDCS coverage.

Further details of these steps and further embodiments thereof will now be illustratively explained in the context of FIGS. 1-11.

Figure 1:
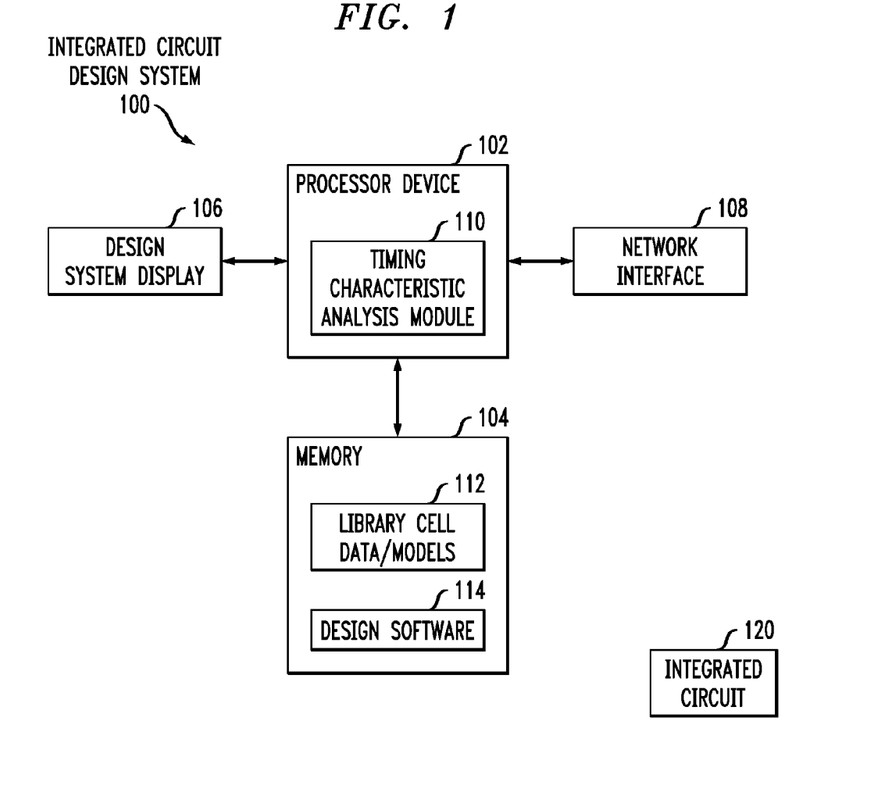
FIG. 1 is a diagram showing an integrated circuit design system with timing characteristic generation and analysis functionality according to an embodiment of the invention.

FIG. 1 is a diagram showing an integrated circuit design system with timing characteristic generation and analysis functionality according to an embodiment of the invention. As shown, system 100 includes a processor device 102 coupled to a memory 104 and a display 106. The system 100 also includes a network interface 108, coupled to the processor 102, for permitting the system 100 to communicate with other systems and devices over one or more networks. In one embodiment, network interface 108 comprises one or more transceivers. The processor device 102 implements a timing characteristic analysis module 110 with timing characteristic generation and analysis functionality for improving timing analysis in an integrated circuit design in a manner disclosed herein. The timing characteristic analysis module 110 operates in conjunction with a library cell data/model module 112. The system 100 also includes design software 114 which itself includes other design system tools. The library cell data/model module 112 and the other tools (modules) 114 are shown in FIG. 1 as being stored in memory 104. However, it is to be understood that parts or all of modules 112 and 114 are loaded and executed by the processor 102 when needed.

The library cell data/models module 112 stores the library of LCs that the system 100 uses to create SCCSTC structures for SCDCS tasks in accordance with embodiments of the invention. The design software 114 includes tools with other functions and operations of an integrated circuit design system which are not the focus of embodiments of the invention and thus are not further described herein. For example, other system design tools include, but are not limited to, a circuit simulation tool, a noise analysis tool, etc.

Elements such as 110, 112 and 114 are implemented at least in part in the form of software stored in memory 104 and processed by processor device 102. For example, the memory 104 stores program code that is executed by the processor device 102 to implement the timing characteristic generation and analysis functionality of module 110 within an overall integrated circuit design process. The memory 104 is an example of what is more generally referred to herein as a computer-readable storage medium or other type of computer program product having computer program code embodied therein, and comprises, for example, electronic memory such as RAM or ROM, magnetic memory, optical memory, or other types of storage devices in any combination. The processor device 104 comprises a microprocessor, a central processing unit (CPU), an application specific integrated circuit (ASIC), a field programmable gate array (FPGA) or other type of processing device, as well as portions or combinations of such devices.

It is to be understood that, in other embodiments, the integrated circuit design system 100 in FIG. 1 also includes other systems, processes and/or operations (not expressly shown) for: generating one or more masks specific to the given integrated circuit design; and applying the one or more masks to a silicon die (wafer) during fabrication of the given integrated circuit. A result of the integrated circuit design processes performed by the system 100 is integrated circuit 120 shown in FIG. 1.

Figure 2:
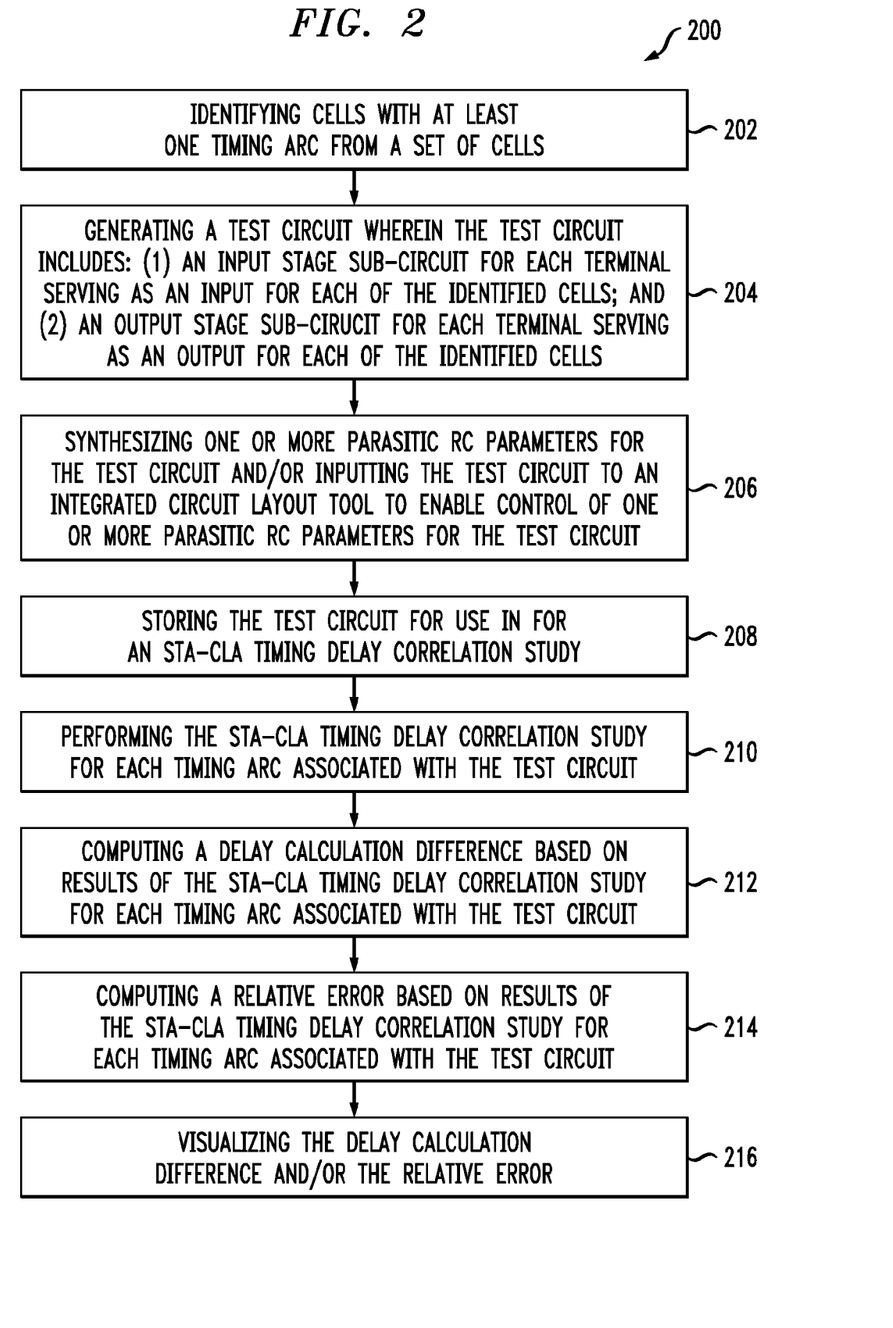
FIG. 2 is a diagram showing a timing characteristic generation and analysis methodology according to an embodiment of the invention.

FIG. 2 is a diagram showing a timing characteristic generation and analysis methodology 200 according to an embodiment of the invention. It is to be understood that, in one embodiment, methodology 200 is implemented by module 110 in the integrated circuit design system 100 in FIG. 1.

Figure 3:
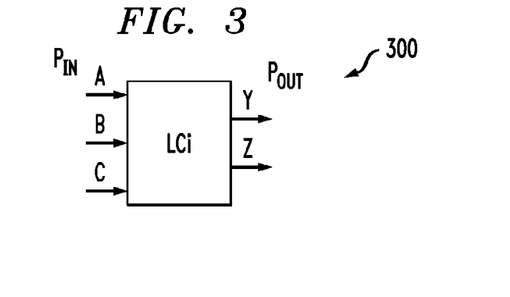
FIG. 3 is a diagram illustrating a generic library cell according to an embodiment of the invention.

A schematic of a generic library cell LCi (300) with three input pins Pin (A, B and C) and two output pins Pout (Y and Z) is illustrated in FIG. 3. For accurate integrated circuit timing sign-off, the SCDCS examines STA tool delay calculation results in reference to the best data available by using a CLA tool for arrival points in a timing path going through an input pin and an output pin of LCi. Embodiments of the invention realize that, to achieve full coverage (e.g., 100 percent) of the timing arcs of cell LCi, all valid timing arcs from all input pins of LCi to all output pins of LCi should be analyzed by the STA tool and simulated by the CLA tool. However, it is not always possible to create valid stimulus for the CLA tool to analyze all the possible timing arcs of LCi due to conflicting stimulus needed when analyzing multiple arcs. This is overcome by methodology 200 of FIG. 2 which shows steps used to create an SCDCS-oriented SCCSTC for all timing arcs of library cells with timing arcs (for example, such as the library cell 300 in FIG. 3).

In step 202, the methodology 200 identifies the collection of library cells for the SCDCS task including all the library cells with at least one timing arc.

In step 204, the methodology 200 generates a test circuit (an SCCSTC) wherein the test circuit includes: (1) an input stage sub-circuit for each terminal serving as an input for each of the identified cells; and (2) an output stage sub-circuit for each terminal serving as an output for each of the identified cells.

For example, for each input and each bi-directional pin Pin of each of the library cells LCs in the LC collection identified in step 202, a sub-circuit SC is created such that the output port of this sub-circuit connects to Pin, and the input port of the SC is identified as a primary port of the SCCSTC. As a result, all the SCs for all the Pin pins of the LC are independent of each other. Since the SCs for different timing paths are independent from each other, the needed CLA stimulus is created such that valid CLA results are obtained. Then, the same step (creation of independent sub-circuits) is repeated for all the output pins Pout of the LC. Here, the port connection for the SC is such that the input port of the SC is connected to Pout, and the output port of the SC is identified as a primary port of the SCCSTC. As a result, all the SCs for all the Pout pins of the LC are independent of each other. Again, since the SCs for different timing paths are independent from each other, the needed CLA stimulus is created such that valid CLA results are obtained.

In step 206, one or more parasitic RC parameters for the test circuit are synthesized. That is, the selections of the SCs are parameterized based on technology node and library cell timing characterization methodologies. It is not necessary that each SC be identical. A port-to-port timing constraint condition is created for each input-output pair of the LC. If LC has a clock pin, a clock is also created for the clock pin of the LC, and a clock waveform is specified for the created clock. A timing path is added to a timing paths collection (e.g., maintained by module 110 in system 100) used for the SCDCS for each input/output pin pair of the LC where a timing arc exists.

The parasitic RC parameters associated with the connections in the SCCSTC are thus synthesized to satisfy library cell driving pin requirements, with precise control of the parameters. Alternatively, the SCCSTC can be fed into an integrated circuit layout tool, hence enabling fine control of the parasitic RC values for the SCDCS.

In step 208, the SCCSTC is saved in a Verilog, VHDL or some other HDL format, resulting in a specific SCCSTC with independent timing paths for all pins of all cells in the library with timing arcs.

In step 210, the methodology 200 performs the SCDCS for each timing arc associated with the SCCSTC. The results of the SCDCS are used to compute a delay calculation difference for each timing arc associated with the test circuit, in step 212. Further, in step 214, the results of the SCDCS are used to compute a relative error for each timing arc associated with the test circuit. In step 216, the delay calculation difference and/or the relative error are visualized for presentation to the designer on a display screen.

Examples of results from the execution of methodology 200 will now be explained.

Figure 4:
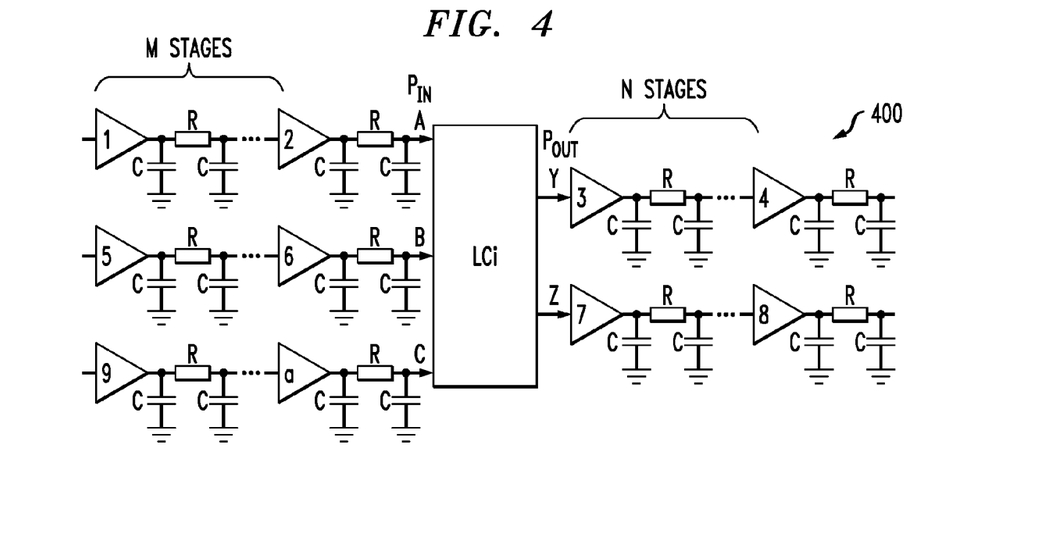
FIG. 4 illustrates a test circuit configuration for the generic library cell of FIG. 3.

For the library cell LCi of FIG. 3, one exemplary configuration 400 of the SCCSTC created in accordance with methodology 200 is illustrated in FIG. 4. The configuration 400 shows LCi with the parasitic RC elements and M waveform-shaping input-stages and N load-simulating output stages.

The corresponding Verilog netlist and parasitic data in Standard Parasitic Exchange Format (SPEF) for the SCCSTC created via methodology 200 can be saved in appropriately formatted files. For each of the three input pins of LCi (A, B and C), an independent input stage sub-circuit with M stages is created. For each output pin of LCi (Y and Z), an independent output stage sub-circuit with N stages is created. M and N are parameters that are tuned for circuit waveform shaping so that the waveform is realistic as opposed to an ideal waveform. The circuit elements labeled 1, 2, . . . , 8 in each stage are not necessarily the same circuit elements. Also, the R and C elements between circuit elements 1, 2, . . . , 8 are not necessarily the same. In one embodiment, the R and C values are selected such that the total C value between each circuit element is half of the maximum loading capacitance allowed for the circuit element driving that RC section.

It is to be further understood the actual cell parameter for circuit elements labeled 1, 2, . . . , 8 in FIG. 4, and the value for each R or C element connected to these circuit elements in the M stages and N stages of the SC are dependent on what technology (e.g., 90 nm, 65 nm, 40 nm, 28 nm, 20 nm, etc.) cell library the timing characteristics study is intended for. Thus, as mentioned above, the M and N numbers of stages, the specific cell physical parameters (such as N and P type transistor sizes used in the circuit elements, the actual cell configurations used in the M and N stages, etc.) can be different. The M, N, R and C values and the cells 1, 2, . . . , 8 (note that 8 is just an example used in labeling the cells used in the SC and more or less elements can be used) are chosen such that they represent the intended LCi input pin waveform shape used in the timing characterization study and the intended LCi output pin loading situation used in the timing characterization study.

Since the input port of the input-stage sub-circuit for each input pin A, B and C of LCi is independent of any other input pin input-stage sub-circuit of LCi, stimulus can be independently applied to the input port of these independent paths. The same is true for all the output ports of the output-stage sub-circuits of the output pins of LCi. This approach makes it possible to achieve full (e.g., 100 percent) coverage of the timing arcs of LCi for SCDCS tasks.

Figure 5:
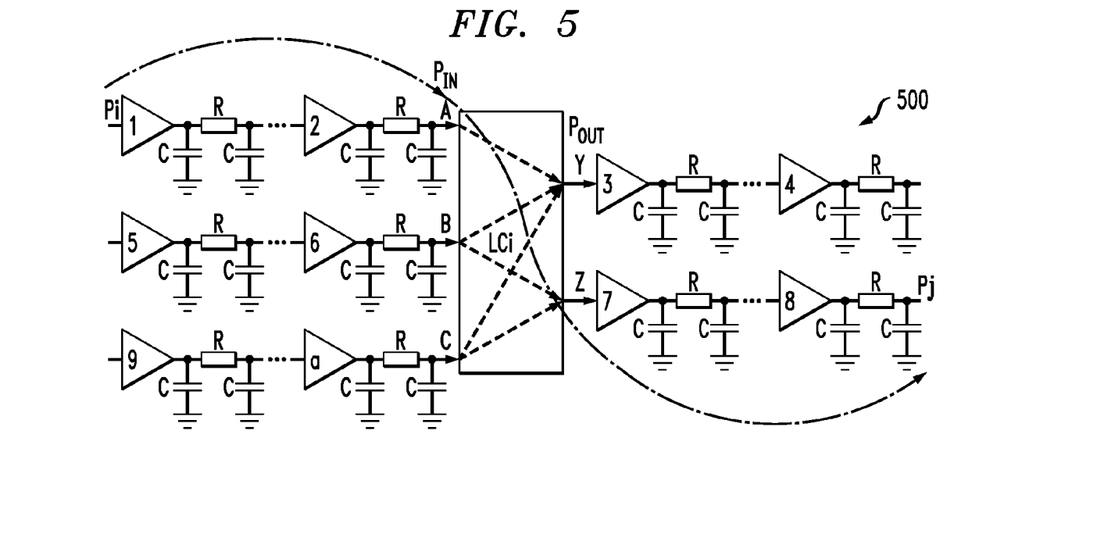
FIG. 5 illustrates a sub-circuit for a timing arc of the test circuit configuration of FIG. 4.

In configuration 500 in FIG. 5 (which is the same as configuration 400 in FIG. 4), the timing path from port Pi through input pin A of LCi and output pin Z of LCi, to port Pj is illustrated by the dashed/dotted line, setting the stage for performing SCDCS for the timing arc A→Z of LCi. The above process is repeated for all the other timing arcs through input pins and output pins of LCi. Since all the input ports Pi are independent of each other, and the input-stage sub-circuits of input pins A, B, C are also independent of each other, the port stimulus can be set independently to achieve valid CLA stimulus for all timing arcs of LCi.

Figure 6:
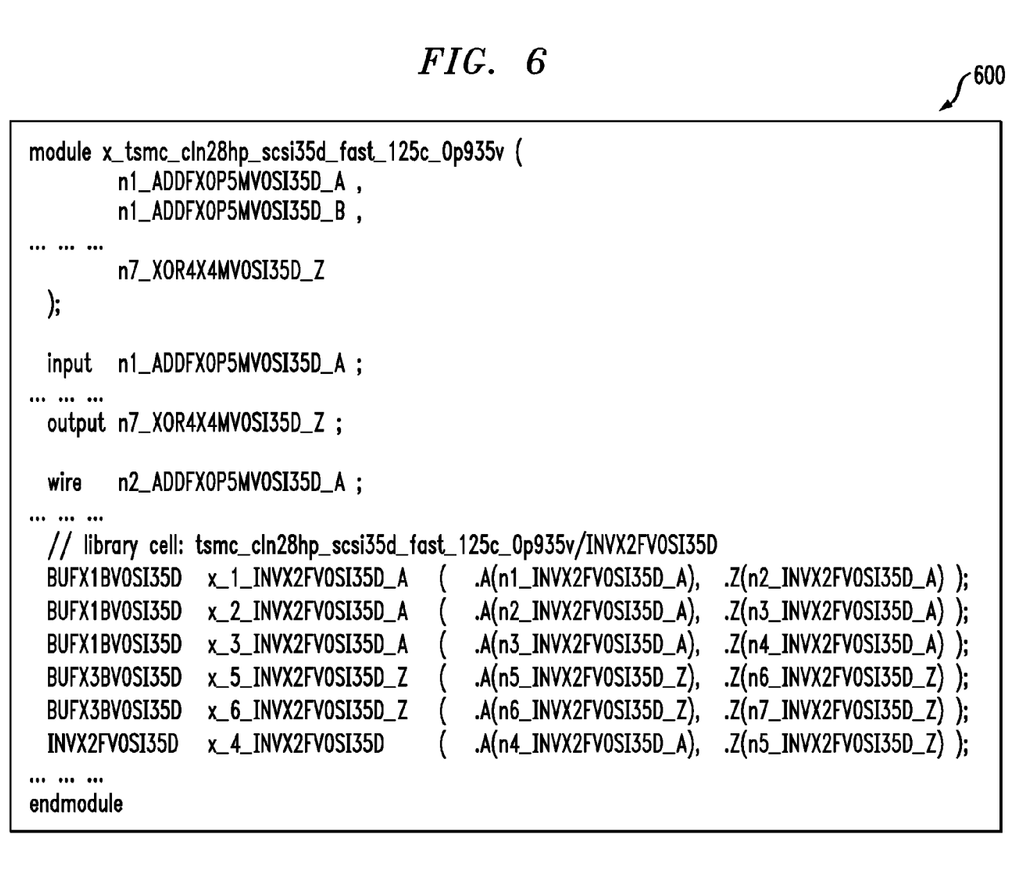
FIG. 6 illustrates a test circuit netlist for a cell library according to an embodiment of the invention.

An example section 600 of the Verilog netlist created from the SCCSTC construction is shown in FIG. 6. After the SCCSTC is created for a set of library cells, STA and CLA processes are performed for each of the timing paths saved in the timing paths collection. After performing STA and also the corresponding CLA, the delay calculation difference is computed and the relative error is also computed. The difference/error information is used to identify potential issues with the STA tool delay calculation engine or other issues in the timing characterization parameter assumption and STA delay calculation interaction.

Figure 7:
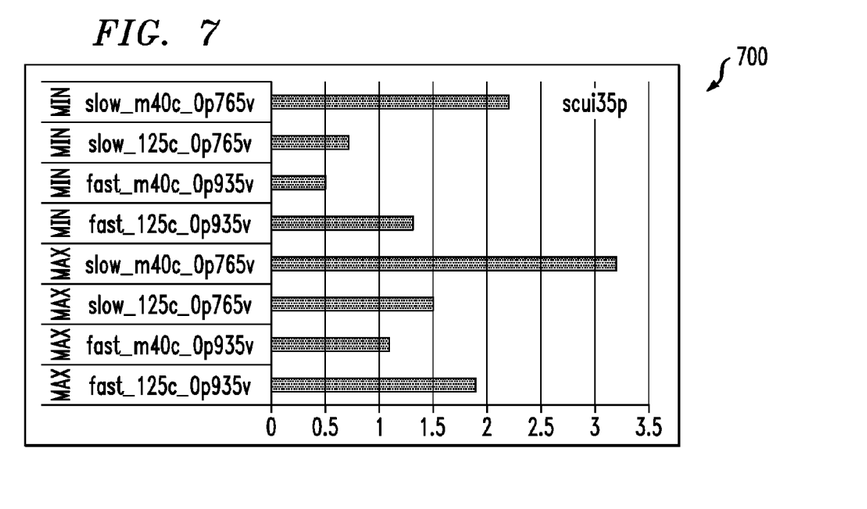
FIG. 7 illustrates a delay calculation percentage error bar chart for a first cell library according to an embodiment of the invention.
Figure 8:
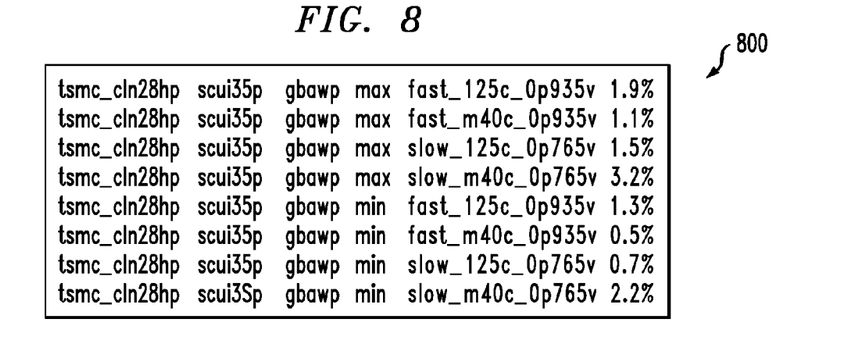
FIG. 8 illustrates a set of delay correlation study results according to an embodiment of the invention.

In graph 700 of FIG. 7, the delay calculation error between the STA tool PrimeTime® and the CLA tool HSPICE® (both commercially available from Synopsis Inc. of Mountain View, Calif.) is plotted for all the timing paths including the timing arcs of an example SCCSTC (created from cell library referred to as scui35p). Such plots are obtained for all the process, voltage and temperature range combinations to be used in integrated circuit design timing sign-off. Table 800 in FIG. 8 illustrates an example error table for the delay calculation error graph 700 of FIG. 7.

Figure 9:
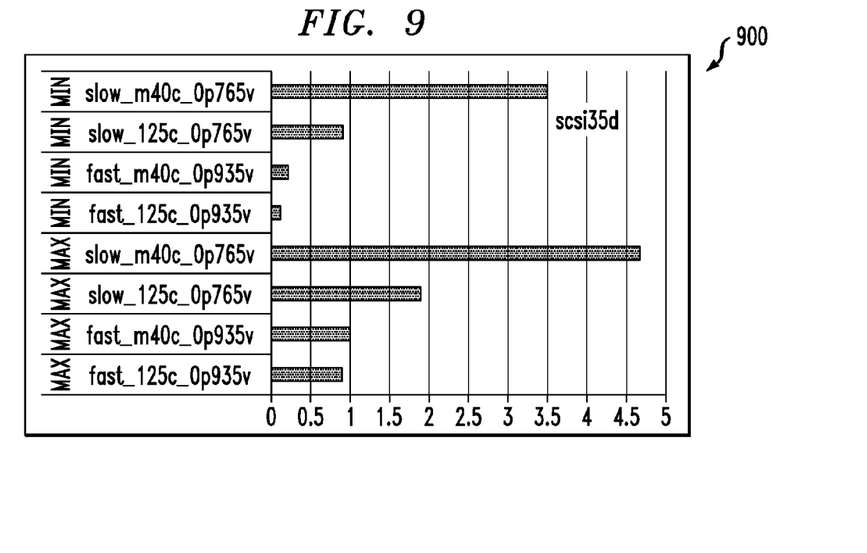
FIG. 9 illustrates a delay calculation percentage error bar chart for a second cell library according to an embodiment of the invention.
Figure 10:
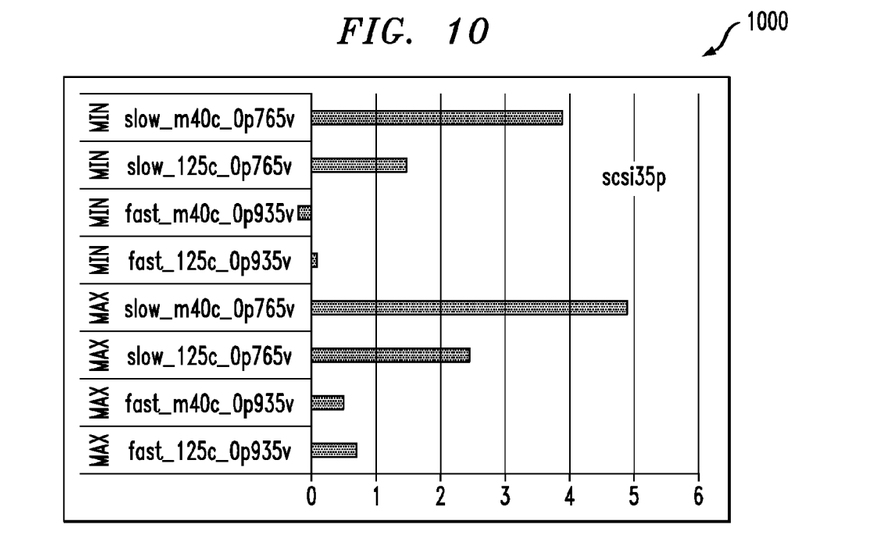
FIG. 10 illustrates a delay calculation percentage error bar chart for a third cell library according to an embodiment of the invention.
Figure 11:
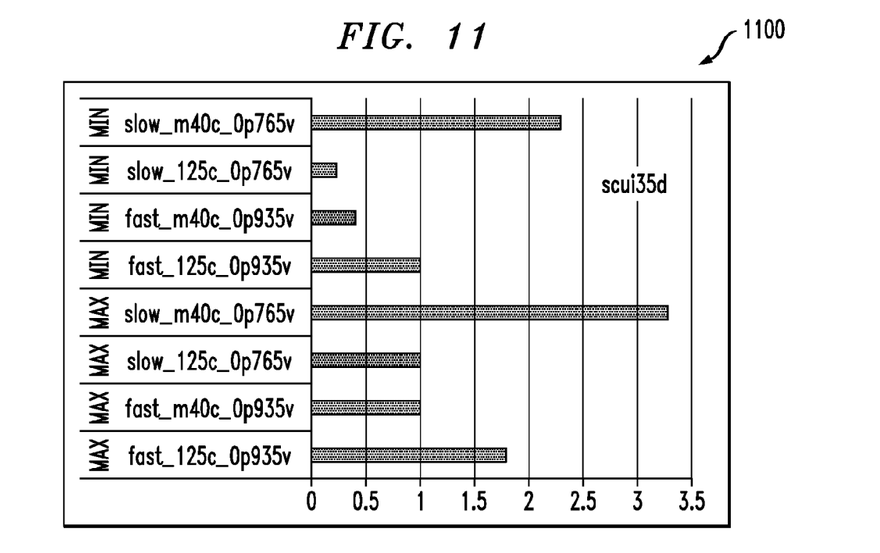
FIG. 11 illustrates a delay calculation percentage error bar chart for a fourth cell library according to an embodiment of the invention.

In the graphs 900, 1000 and 1100 respectively shown in FIGS. 9, 10 and 11, relative percentage errors are depicted for all timing arcs in cell libraries referred to as scsi35d, scsi35p and scui35d, respectively. It is to be understood that the methodologies according to embodiments of the invention can be used to sweep many parameters, such as, for example, a timing arc signal transition direction, a minimum delay, a maximum delay, a process, voltage and desired temperature setting. These parameters are of interest to the correlation studies.

As described herein, embodiments of the invention makes it possible to arbitrarily, individually and independently parameterize the input stage and the output stage for the library cell under study, something that cannot be done when the SCCSTC is not created in such a way for SCDCS purpose, since these values are chosen and assigned by the SCCSTC creation engineer as desired. The existing approach is to use a place and route tool to create the SCCSTC wherein the place and route determines the R and C values using its internal algorithm, making it impossible to arbitrarily, individually and independently parameterize the input stage and the output stage for the library cell under study, as these R and C values would be calculated based on the actual physical place and route results (that could best be an approximation of engineer's intended values). This is an important distinction, as for the SCDCS purpose, embodiments of the invention provide precise, fast and efficient control of the LCi input/output pin connection SCs that are created.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method comprising:
    identifying cells with at least one timing arc from a set of cells, wherein the set of cells are useable in an integrated circuit design;
    generating a test circuit comprising an input stage sub-circuit for each terminal serving as an input for each of the identified cells, and an output stage sub-circuit for each terminal serving as an output for each of the identified cells, wherein each input stage sub-circuit is independent of each other input stage sub-circuit, and each output stage sub-circuit is independent of each other output stage sub-circuit; and
    storing the test circuit for use in a timing delay correlation operation between a first timing analysis process and a second timing analysis process;
    wherein the identifying, generating and storing steps are performed by at least one processing device and at least one memory operatively coupled to the processing device.

2. The method of claim 1, further comprising the step of synthesizing one or more parasitic-based parameters for the test circuit.

3. The method of claim 1, further comprising the step of inputting the test circuit to an integrated circuit layout tool to enable control of one or more parasitic-based parameters for the test circuit.

4. The method of claim 1, further comprising the step of performing the timing delay correlation operation for each timing arc associated with the test circuit.

5. The method of claim 4, further comprising the step of computing a delay calculation difference based on results of the timing delay correlation operation for each timing arc associated with the test circuit.

6. The method of claim 5, further comprising the step of computing a relative error based on results of the timing delay correlation operation for each timing arc associated with the test circuit.

7. The method of claim 6, further comprising the step of visualizing at least one of the delay calculation difference and the relative error.

8. The method of claim 7, wherein at least one of the delay calculation difference and the relative error is visualized for one or more process, voltage and temperature range combinations to be used in a timing sign-off operation for the integrated circuit design.

9. The method of claim 1, wherein the first timing analysis process comprises a static timing analysis and the second timing analysis process comprises a circuit level analysis.

10. The method of claim 1, wherein the storing step further comprises storing the test circuit in a hardware description language format.

11. An integrated circuit designed in accordance with the steps of claim 1.

12. A computer program product comprising non-transitory computer-readable storage medium having computer program code embodied therein for use in designing an integrated circuit, wherein the computer program code when executed in an integrated circuit design system causes the integrated circuit design system to perform the steps of:
    identifying cells with at least one timing arc from a set of cells, wherein the set of cells are useable in an integrated circuit design;
    generating a test circuit comprising an input stage sub-circuit for each terminal serving as an input for each of the identified cells, and an output stage sub-circuit for each terminal serving as an output for each of the identified cells, wherein each input stage sub-circuit is independent of each other input stage sub-circuit, and each output stage sub-circuit is independent of each other output stage sub-circuit; and
    storing the test circuit for use in for a timing delay correlation operation between a first timing analysis process and a second timing analysis process.

13. An apparatus comprising:
a memory; and
a processing device operatively coupled to the memory and configured to:
identify cells with at least one timing arc from a set of cells, wherein the set of cells are useable in an integrated circuit design;
generate a test circuit comprising an input stage sub-circuit for each terminal serving as an input for each of the identified cells, and an output stage sub-circuit for each terminal serving as an output for each of the identified cells, wherein each input stage sub-circuit is independent of each other input stage sub-circuit, and each output stage sub-circuit is independent of each other output stage sub-circuit; and
store the test circuit for use in for a timing delay correlation operation between a first timing analysis process and a second timing analysis process.

14. The apparatus of claim 13, wherein the processing device is further configured to synthesize one or more parasitic-based parameters for the test circuit.

15. The apparatus of claim 13, wherein the processing device is further configured to input the test circuit to an integrated circuit layout tool to enable control of one or more parasitic-based parameters for the test circuit.

16. The apparatus of claim 13, wherein the processing device is further configured to perform the timing delay correlation operation for each timing arc associated with the test circuit.

17. The apparatus of claim 16, wherein the processing device is further configured to compute a delay calculation difference based on results of the timing delay correlation operation for each timing arc associated with the test circuit.

18. The apparatus of claim 17, wherein the processing device is further configured to compute a relative error based on results of the timing delay correlation operation for each timing arc associated with the test circuit.

19. The apparatus of claim 18, wherein the processing device is further configured to visualize at least one of the delay calculation difference and the relative error.

20. The apparatus of claim 13, wherein the first timing analysis process comprises a static timing analysis and the second timing analysis process comprises a circuit level analysis.

* * * * *